United States Patent
Streit

[11] Patent Number: 6,096,975
[45] Date of Patent: Aug. 1, 2000

[54] SPLIT GROOVED SHEATH AND METHOD AND APPARATUS FOR MAKING SAME

[75] Inventor: Bernard Streit, Anteuil, France

[73] Assignee: Sofanou S.A., Clerval, France

[21] Appl. No.: 09/136,057

[22] Filed: Aug. 17, 1998

Related U.S. Application Data

[63] Continuation of application No. PCT/IB96/00360, Apr. 22, 1996.

[30] Foreign Application Priority Data

Feb. 28, 1996 [FR] France ................................ 96 02771

[51] Int. Cl.⁷ ............................... H02G 3/04; H02G 3/00
[52] U.S. Cl. ..................... 174/68.3; 174/68.1; 174/72 A; 174/70 C; 138/128
[58] Field of Search ................. 174/136, 70 C, 174/68.3, 72 C, 135, 72 A; 138/128

[56] References Cited

U.S. PATENT DOCUMENTS

| | | | |
|---|---|---|---|
| 1,485,994 | 3/1924 | Salisbury | 138/128 |
| 2,949,953 | 8/1960 | Di Maio | 154/28 |
| 3,060,069 | 10/1962 | Sindars | 138/120 |
| 3,627,615 | 12/1971 | Guilford et al. | 156/466 |
| 3,677,676 | 7/1972 | Helger | 425/504 |
| 3,900,697 | 8/1975 | Yotsugi | 174/5 R |
| 3,975,581 | 8/1976 | Lowenhar | 333/33 |
| 3,976,414 | 8/1976 | Hegler et al. | 425/131.1 |
| 4,003,685 | 1/1977 | Maroschak | 425/135 |
| 4,513,787 | 4/1985 | Hegler et al. | 138/166 |
| 4,527,319 | 7/1985 | Rosenbaum et al. | 29/33 T |

FOREIGN PATENT DOCUMENTS

| | | |
|---|---|---|
| 1302310 | 6/1992 | Canada . |
| 0 114 213 | 8/1984 | European Pat. Off. . |
| 2.171.844 | 9/1973 | France . |
| 2 264 649 | 10/1975 | France . |
| 24 13 879 | 9/1977 | Germany . |
| 3405552 A1 | 8/1985 | Germany . |
| 89 03 070 | 6/1989 | Germany . |
| 44 00 695 A1 | 7/1994 | Germany . |
| 1 250 639 | 10/1971 | United Kingdom . |
| 1 311 205 | 3/1973 | United Kingdom . |
| 1 343 695 | 1/1974 | United Kingdom . |

*Primary Examiner*—Kristine Kincaid
*Assistant Examiner*—Mark Olds
*Attorney, Agent, or Firm*—Merchant & Gould, PC

[57] ABSTRACT

A grooved tubular protective sheath (10) with a slot and a longitudinal flange. In particular, the flange (24) is provided on one edge (16) of the slot substantially at the bottom of the grooves (12) and positionable under the other slot edge (17). The grooves are closed at the edges (16, 17) of the slot by transverse walls (22). A method for manufacturing a grooved sheath includes extruding and molding an annular sheath with a longitudinal flat strip level with flute edge hollows, cutting the flat strip along one of its flute edges to form a tongue that is integral only with the other flute edge. The method further includes heating the sheath and cooling it, while passing it between cones or calenders to bring the flute edges together, whereby the tongue passes between the cut edge. A device for making a grooved sheath includes a molding machine with two series of symmetrical parallel shells. Internal faces of the shells are semi-cylindrical and ribbed transversely with a series of rainbow-shaped flutes forming a crenellated profile with flute hollows and flute ridges. Each shell in one of the series has a protuberance in form of a thin flat strip situated level with the flute ridges, wherein the strip is aligned from one shell to the next.

7 Claims, 1 Drawing Sheet

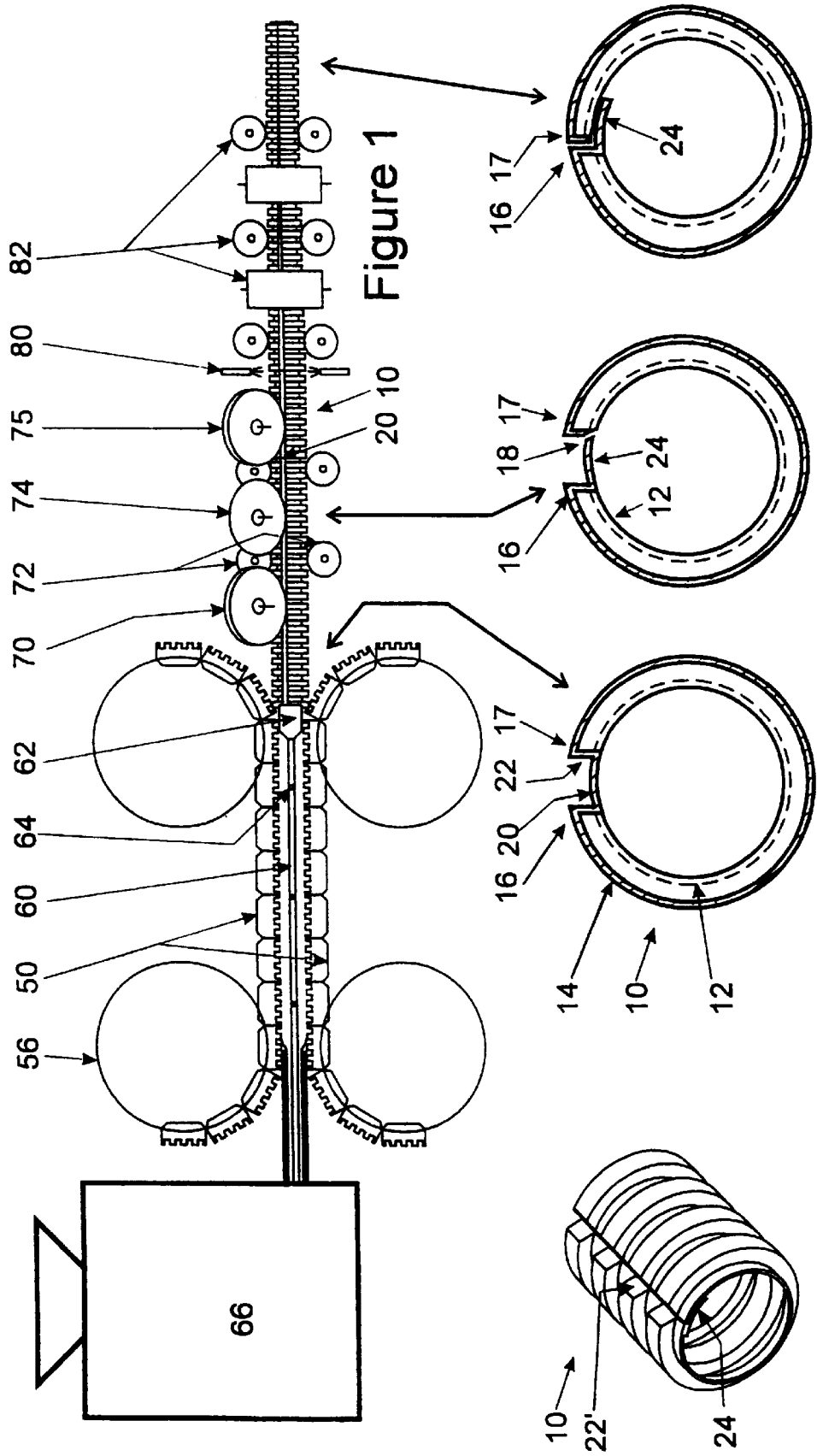

SPLIT GROOVED SHEATH AND METHOD AND APPARATUS FOR MAKING SAME

This is a continuation of PCT/IB96/00360 application filed Apr. 22, 1996.

FIELD OF THE INVENTION

The present invention relates to an annulate flexible tubular sheath, and more particularly to a sheath used for the protection and positioning of bundles of electrical wires and cables.

BACKGROUND OF THE INVENTION

Annulate tubular sheaths, that is to say those whose shape resembles a succession of interconnected rings, are usually produced from plastic, such as extruded polypropylene. These sheaths enable complex protection networks to be produced for bundles of electrical wires or cables within ships, aeroplanes or motor vehicles, and in the latter case notably in the engine compartment. This is because, given the limited space available, these sheaths or tubes need to be able to follow non-rectilinear walls very closely and skirt around the various components encountered. With such annulate sheaths, it is, indeed, possible to produce curves whose radius of curvature is less than three times their diameters, without their being deformed inwards or even breaking.

One embodiment of such sheaths consists of extruding a plastic tube and pressing it as soon as it emerges against the annulate internal faces of a double series of shells situated opposite each other and progressing with the advance of the tube to a so-called "moulding" machine. It is thus possible to continuously produce long lengths of sheaths, which are then stored on transport drums. Such embodiments are described in greater detail for example in the documents FR 2 171 844, GB 1 250 639 and GB 1 311 205.

When these sheaths are used in a vehicle, the problem of inserting a strand of wires inside sections of sheaths is encountered. For a rectilinear section of sheath of around one metre, it is possible to insert the cables and then simply push them from one of its ends. This operation rapidly becomes more laborious for sections of greater length or for pre-installed sections with a number of curves.

In relation to this, for example from the documents FR 2 264 649 or DE 24 13 879, double-walled sheaths are known: an external one, annulate for flexibility, and a smooth internal one for the easy insertion of the cables. Also, for example from the document CA 1 302 310, annulate tubes are known manufactured with a factory-installed internal wire called a "wire puller" for the subsequent pulling of cables. However, these sheaths require additional material, and require costly conversions of the manufacturing equipment.

More commonly, in the field of annulate protection sheaths, split sheaths, that is to say those which have been cut along a longitudinal straight line at the end of the manufacturing process, are being offered. It is then easy later on, in any area of the sheath, to insert electrical wires and cables directly through this slot which, normally, closes up again by virtue of the transverse rigidity provided by the flutes. Such sheaths remain inexpensive.

Though satisfactory in the majority of cases, it is nevertheless found that these split sheaths can allow wires to escape in areas with a small radius of curvature where the slot tends to open up again.

In order to overcome this drawback, the document DE-U-89 03 070 proposes a longitudinally split extruded sheath, the edges of whose slot are profiled in the form of two complementary longitudinal hooks. The hook edge facing outwards has a tongue above it for clamping and holding the other edge. However, the complexity of the profile of these hooks in association with the tongue makes the extrusion nozzle and the forming shells particularly costly. Furthermore, closure of the slot by engaging hooks all the way along the slot is difficult, with the risk of being poorly executed in many places. The documents EP 0 114 213 and DE 34 05 552 describe variants of even more complex slot closure devices.

SUMMARY OF THE INVENTION

The aim of the present invention is a split annulate protective sheath comprising a means of efficaciously closing the slot, that is to say a means which opens easily when cables are inserted, closes immediately afterwards, and remains so thereafter whatever the shape of the subsequent path given to the sheath once installed, and this despite the presence of any vibrations. Such a sheath should also remain inexpensive to produce.

The objectives are attained by a split annulate tongued sheath by virtue of the fact that a simple continuous longitudinal tongue is formed on one of the edges of the slot substantially level with the hollow of the flutes, and that this tongue lodges under the other edge of the slot.

By virtue of the presence of the flutes, the profile of a slot edge takes the form of a wavy line which can be defined, by analogy with the teeth of a rack, by a flute hollow, a flute top and a flute depth.

When the strand is inserted into the sheath according to the invention, the tongue functions in the manner of a shutter. Then, if this sheath is called upon to describe very severe radii of curvature, which in normal sheaths gives rise to a slight re-opening of the slot, the tongue keeps the slot closed. The cables, by exerting a pressure against the walls of the sheath, actually push the corresponding tongue area against the other edge, thereby confirming the locking of the closure. Deterioration of the cables against the slot is thus avoided.

According to a preferred embodiment, the thickness of the tongue represents substantially the thickness of the wall of the annulate tube, and its width represents between 1/10 and 1/2 of the internal diameter of the sheath, preferably between 1/6 and 1/3 of the internal diameter.

This width of the tongue constitutes a good compromise between easy opening of the slot when a cable is inserted and effective closure of the slot under the condition of extreme curvature of the sheath.

The flutes are usefully closed at the edges of the slot by transverse walls. This arrangement provides additional sealing at the slot against dust and other undesirable substances, and also renders the slot less aggressive to cables.

If required, the flute edge walls can be oblique and oriented towards the outside to facilitate the insertion of the bundle of cables.

One advantageous embodiment of a sheath according to the invention consists of:

extruding and then moulding an annulate sheath having a longitudinal flat strip level with the flute edge hollows, cutting the flat strip along one of its flute edges to form a tongue integral only with the other flute edge, heating the sheath and then cooling it by passing it through restriction means, such as cones or calenders, so as to bring the flute edges together, the tongue passing beneath the cut edge.

Compared with the method of manufacturing a standard split annulate sheath, this method requires only a modification to the initial profile of the sheath in the moulding machine and an extra heat shrinking operation, which means that the sheath according to this invention remains inexpensive to produce.

A device specially designed for implementing the method described above, this device comprising, at the outlet of an extruder, a moulding machine with two series of symmetrical parallel shells whose internal faces each have a semi-cylindrical shape ribbed transversely with a series of rainbow-shaped flutes, is particularly remarkable in that each half-shell in one of the series has a protuberance in the form of a thin flat strip situated level with the flute ridges, these strips being aligned from one shell to the next.

BRIEF DESCRIPTION OF THE DRAWING

The invention will be better understood from a study of an embodiment taken in a completely non-limitative way and illustrated in the accompanying figures in which:

FIG. 1 is a diagrammatic view of a device for manufacturing an annulate sheath,

FIGS. 2a, 2b and 2c illustrate the cross section of a sheath being produced in the device according to FIG. 1, and FIG. 3 illustrates a portion of sheath in perspective.

DETAILED DESCRIPTION OF PREFERRED EMBODIMENTS

The left-hand half of FIG. 1 illustrates a conventional device for manufacturing annulate tubes 10. This device notably comprises, at the outlet of an extruder 66, a moulding machine comprising two series of symmetrical parallel shells 50 each driven upstream and downstream by a pair of toothed return wheels 56. The internal face of each shell 50 is semi-cylindrical in shape, ribbed transversely with a series of rainbow-shaped flutes with an apex angle of 180 degrees. Thus two shells, one from each series, situated opposite each other, together form the complete periphery of an annulate sheath portion 10.

Furthermore, a mandrel 60 emerging from the outlet of the extruder 66 bears at its end a closing plug 62 isolating the downstream annulate sheath part 10. An atmospheric overpressure can then be applied between this closing plug and the outlet of the extruder by injecting compressed air emerging from openings 64 in the mandrel. Thus a plastic tube which is still hot on leaving the extruder is immediately pressed into the flutes of the shells 50 so as to take the final annulate shape thereof.

More particularly according to the invention, each half-shell in one of the series, for example the top series in FIG. 1, has a protuberance in the form of a flat plane strip situated level with the flute ridges, these strips being aligned from one shell to the next.

As illustrated in FIG. 2a, the annulate sheath 10 leaving the shells 50 has a continuous flat strip 20 level with its internal face, that is to say level with its flute hollows 12. This flat strip forms a recess defined by two flute edges 16 and 17. These flute edges therefore take the form of crenellated lines oscillating between flute hollows 12 and flute ridges 14. By virtue of the mode of distributing the plastic material by means of overpressure, the thickness of this flat strip 20 is substantially equal to the thickness of the tube as, for example, measured in a flute hollow or ridge. It will also be noted that the edges of the flutes 16 and 17 are blocked, that is to say the flute ridges are closed off by transverse radial walls 22.

As an alternative, and as can be seen better in FIG. 3, the protuberance on the shells can have a trapezoidal cross section. The walls 22' of the slot edges are then oblique and oriented towards the outside.

In the following station, the sheath 10, brought by rollers or other guide means 72, is held with its strip 20 oriented very precisely upwards by an upper orientation disc 70 engaged in this strip. A disc or other cutting means 74 immediately downstream can then effect a continuous separation 18 (FIG. 2b) exactly between the strip and the second flute edge 17, thereby producing a tongue 24 which is integral only with the flute hollow 12 of the first edge 16, as can be seen better in FIG. 2b. The sheath 10 thus split is still held downstream with its tongue oriented upwards by a disc or other upper holding means 75, which, being slightly lower than the first guide disc 70, simultaneously lowers the tongue 24 below the second edge 17.

In the following station, the split sheath is then heated by thermal means 80 such as hot-air nozzles or radiant plates up to a temperature allowing permanent plastic deformation, this temperature depending on the composition of the plastic forming the sheath. During cooling, the sheath then passes through a series of cones or calenders 82 with smaller and smaller output diameters, these cones or calenders squeezing the sheath until the flute edges 16 and 17 come to be adjacent, the tongue 24 being passed fully beneath the second edge 17. The sheath, fully cooled at the output, then definitively retains the shape of the cross section illustrated in FIG. 2c.

When the sheath is used, the operator easily understands that he simply needs to press on the first edge 16 to open the slot, the tongue 24 integral with this edge 16 also moving away from the second edge 17. It is thus possible to insert a first loop of cables and, step by step, press on the adjacent areas of edges 16 in order to carry on inserting the cable over a required length. Once the cable enters the sheath sufficiently in order to pass beyond the tongue 24, the latter closes up automatically in the manner of a shutter by virtue of its elasticity and that of the edge 16.

Thereafter, if the sheath is to be given a curvature such that the flute edges 16 and 17 move apart, it is found that the tongue 24 holds the sheath closed at this point, thereby preventing the cables from emerging.

Numerous improvements can be made to this sheath and to its method of production within the scope of the claims. For example, the flat protuberance on the shells 50 in the manufacturing device modified according to the invention can have a sharp edge along one of its longitudinal edges to prepare the subsequent cut 18. The cooling of the split sheath can be accelerated by a jet of cold air or by passage through a tank of cold water.

I claim:

1. A split grooved sheath (10), comprising a tube shaped with flutes oscillating between flute hollows (12) and flute ridges (14) and spit by a continuous longitudinal slot (18) in two edges (16, 17), wherein a continuous longitudinal tongue (24) is formed on one of the edges (16) of the slot (18), substantially level with the flute hollows (12), the tongue being lodged beneath the other edge (17).

2. The split grooved sheath according to claim 1, wherein a thickness of the tongue (24) is substantially equal to a thickness of a wall of the tube.

3. The split grooved sheath according to claim 1, wherein a width of the tongue (24) is between $1/10$ and $½$ of an internal diameter of the sheath.

4. The split grooved sheath according to claim 1, wherein the flutes are closed level with the edges (16, 17) of the slot (18) by transverse walls (22).

5. The split grooved sheath according to claim 4, wherein the transverse walls (22') are oblique and oriented towards an outside.

6. A method of producing a split grooved sheath comprising a tube shaped with flutes oscillating between flute hollows (12) and flute ridges (14) and split by a continuous longitudinal slot (18) in two flute edges (16, 17), wherein a continuous longitudinal tongue (24) is formed on one of the flute edges (16) of the slot (18), substantially level with the flute hollows (12), the method comprising:

extruding and then molding an annulate sheath (10) having a longitudinal flat strip (20) level with the flute hollows (12), cutting (18) the flat strip along one of its flute edges (17) to form a tongue (24) integral only with the other flute edge (16), and heating (80) the sheath and then cooling it by passing it through restriction means (82), so as to bring the flute edges (16, 17) together, the tongue (24) passing beneath the flute edge (17) from which it has previously been cut.

7. A device for making a split grooved sheath comprising a tube shaped with flutes oscillating between flute hollows (12) and flute ridges (14) and split by a continuous longitudinal slot (18) in two flute edges (16, 17), wherein a continuous longitudinal tongue (24) is formed on one of the flute edges (16) of the slot (18), substantially level with the flute hollow (12), the device comprising:

a molding machine with two series of symmetrical parallel shells (50) whose internal faces each have a semi-cylindrical shape ribbed transversely with a series of rainbow-shaped flutes forming a crenellated profile oscillating between flute hollows and flute ridges, wherein each shell in one of the series has a protuberance in form of a thin flat strip situated level with the flute ridges, said strips being aligned from one shell to the next.

* * * * *